US006463146B1

(12) United States Patent
Hartley et al.

(10) Patent No.: US 6,463,146 B1
(45) Date of Patent: *Oct. 8, 2002

(54) CALL WAITING SERVICE IN A TELECOMMUNICATIONS NETWORK

(75) Inventors: Ian Hartley, Essex; Melvyn C Bale, Ipswich, both of (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,880

(22) PCT Filed: Jun. 25, 1997

(86) PCT No.: PCT/GB97/01700

§ 371 (c)(1),
(2), (4) Date: Mar. 2, 1998

(87) PCT Pub. No.: WO98/01985

PCT Pub. Date: Jan. 15, 1998

(30) Foreign Application Priority Data

Jul. 3, 1996 (GB) .............................. 9613951

(51) Int. Cl.[7] .......................... H04M 3/42; H04L 12/28
(52) U.S. Cl. ................... 379/215.01; 370/389
(58) Field of Search ....................... 379/215.01, 210.01, 379/212.01, 230, 88.17, 90.01, 93.01, 93.09, 93.35; 370/352, 389, 392

(56) References Cited

U.S. PATENT DOCUMENTS

| 4,995,074 A | | 2/1991 | Goldman et al. ............ 379/215 |
|---|---|---|---|
| 5,513,251 A | * | 4/1996 | Rochkind et al. ........... 379/215 |
| 5,533,110 A | | 7/1996 | Pinard et al. ............... 379/201 |
| 5,764,736 A | * | 6/1998 | Shachar et al. ........... 379/93.09 |
| 5,805,587 A | * | 9/1998 | Norris et al. ............... 379/215 |
| 5,894,504 A | * | 4/1999 | Alfred et al. ............ 379/88.13 |
| 5,896,444 A | * | 4/1999 | Perlman et al. ........... 379/93.35 |
| 5,940,489 A | * | 8/1999 | Cohn et al. .................. 379/215 |
| 5,982,774 A | * | 11/1999 | Foladare et al. ............ 370/401 |
| 6,067,353 A | * | 5/2000 | Szeliga ..................... 379/93.35 |

FOREIGN PATENT DOCUMENTS

| CA | 2138565 A | 6/1996 |
|---|---|---|
| WO | WO97/20424 | 6/1997 |
| WO | WO 97/26749 | 7/1997 |

OTHER PUBLICATIONS

Harris et al, "Intelligent Network Realization and Evolution: CCITT Capability Set 1 and Beyond", Proceedings of the International Switching Symposium, Yokohama, Oct. 25–30, 1992, vol. 1–2, Institute of Electronics; Information and Communication Engineers, pp. 127–131.

IBM Technical Disclosure Bulletin, vol. 37, No. 9, Sep. 1, 1994, pp. 101–104, "Workstation Communications System".

* cited by examiner

Primary Examiner—Ahmad F. Matar
Assistant Examiner—Benny Q. Tieu
(74) Attorney, Agent, or Firm—Nixon & Vanderhye P.C.

(57) ABSTRACT

When a public switched telephone network (PSTN) subscriber (28) is occupying their telephone link to connect a personal computer to a computer network, the method provides automatic redirection of an incoming call to said telephone link to a subscriber proxy (38) connected to the PSTN (30) for producing audio interaction with the caller. The subscriber proxy is also connected to said computer network and is capable of sending and receiving messages over said computer network to the subscriber's computer thereby providing the subscriber with a capability to receive notification on said computer of the PSTN call attempt. Optionally, the subscriber has a further capability to interact with said computer to operate the proxy to control and interact with the incoming voice telephone call while the subscriber continues to occupy their telephone link connecting their computer to the computer network.

10 Claims, 9 Drawing Sheets

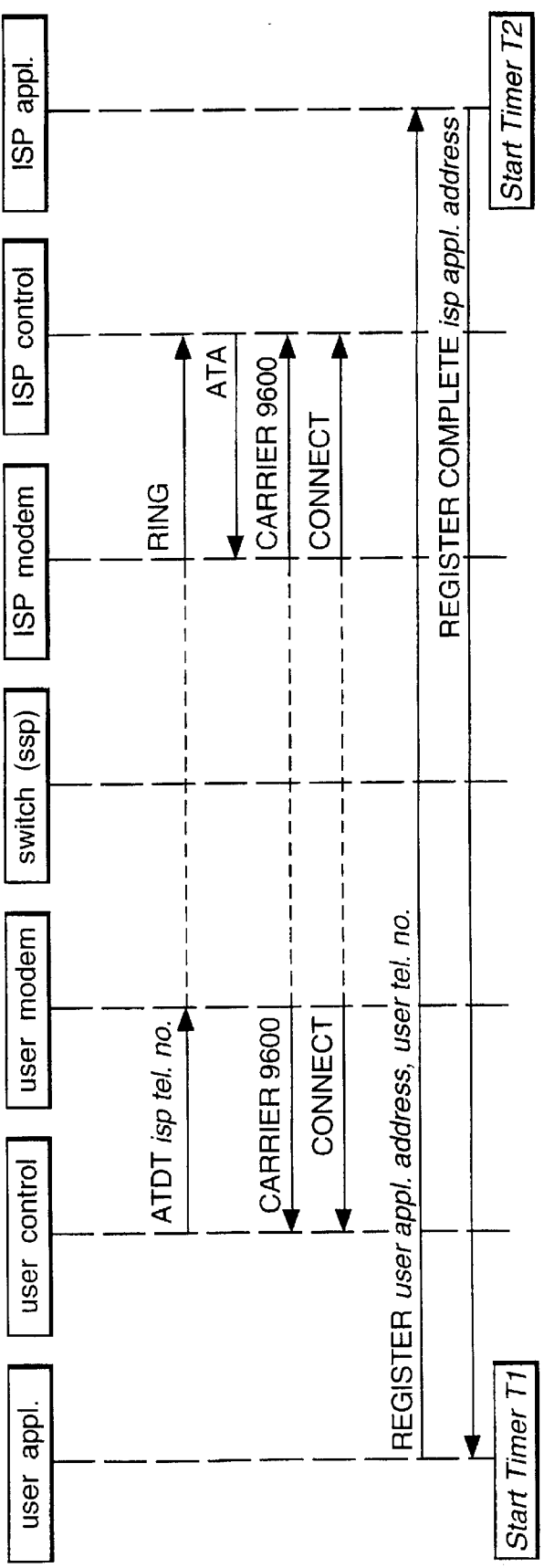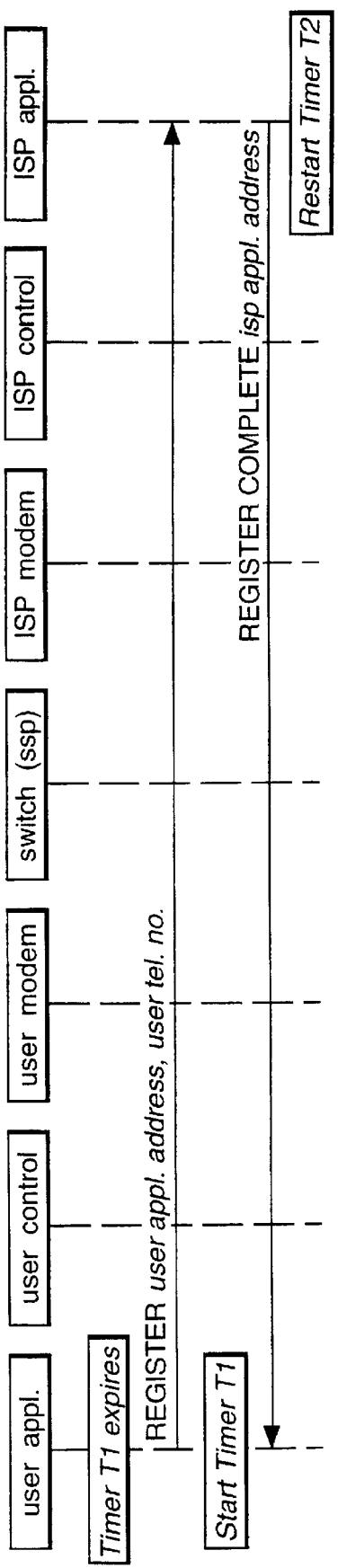
Fig. 5.
Fig. 6.

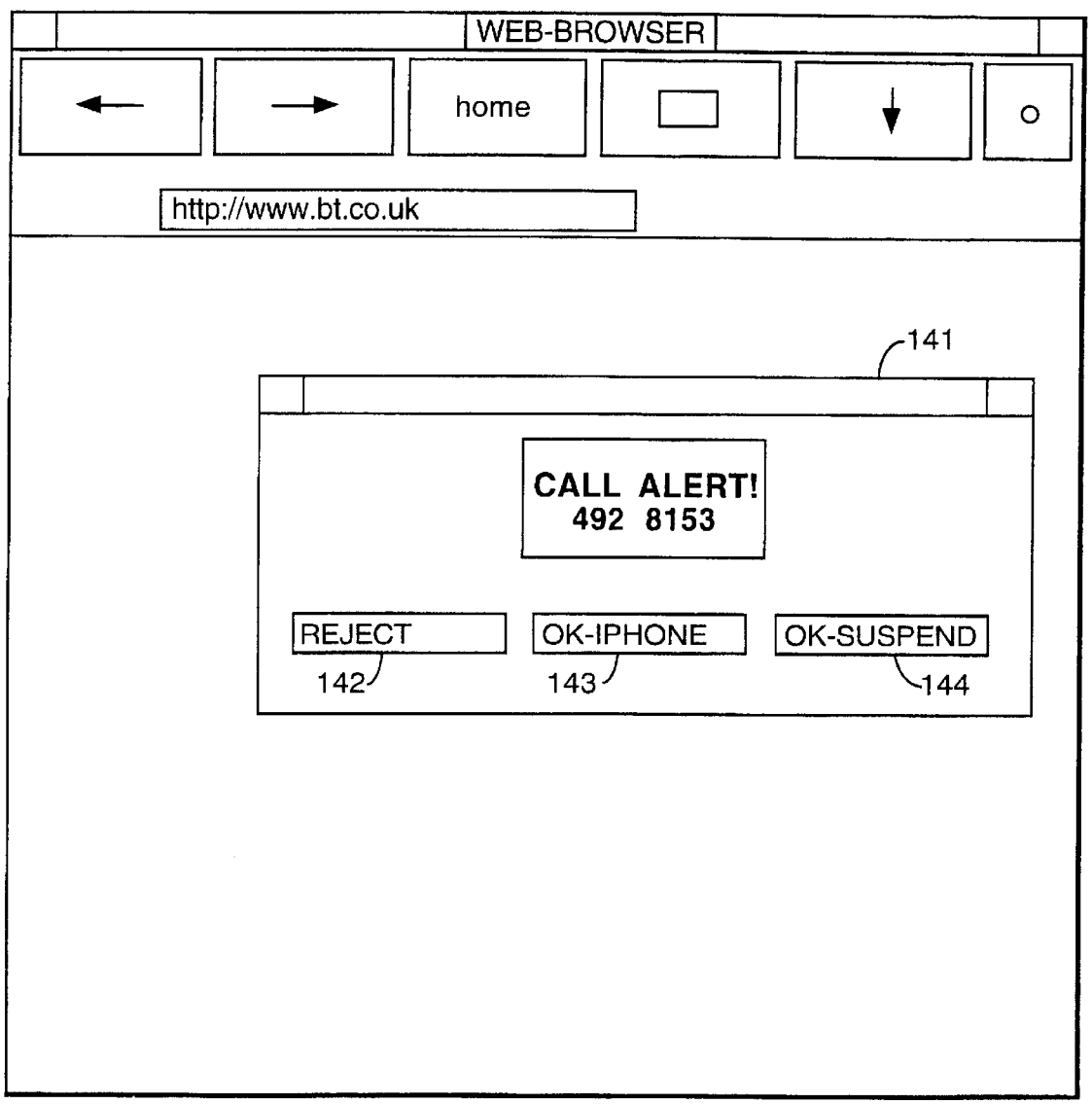

CALL WAITING SERVICE IN A TELECOMMUNICATIONS NETWORK

RELATED APPLICATION

This is a national phase application under 35 U.S.C. §371 based on international application PCT/GB97/01700, the benefit of which is hereby claimed.

BACKGROUND OF THE INVENTION

1. Field of the Invention

The present invention relates to the provision of call-waiting services on a telecommunications network.

2. Related Art

Call-waiting services have been developed and deployed on public switched telephone networks (PSTNs) to provide the option of receiving a call from a third party during the course of an existing call. If the user has subscribed to a call-waiting service, then the network responds to the call from the third party by alerting the user to the fact that there is another caller waiting to contact them. Typically this is done by transmitting a distinctive in-band analogue tone from the network to the user. The user then has the option of interrupting the first call and speaking to the other caller.

It is increasingly common for PSTNs to be used for dial-up data connections. For example, a personal computer and a modem might be used as a data terminal to establish a dial-up connection with an on-line service or an Internet services provider (ISP). However, it has been found that there are serious technical problems with the interaction between conventional call-waiting services and dial-up data connections. The data connection is generally carried over a digital signalling channel in the form of frequency-shift keyed or phase-shift keyed tones transmitted to/from the modem. If a conventional call-waiting service transmits its own analogue tone to the user while the data connection is on-going, then this tone corrupts the signalling channel and will usually cause the connection between the user and the data services provider to be lost.

U.S. Pat. No. 4,995,074 describes the problems outlined above. This patent proposes a solution which involves placing a second computing system (termed "the interface"), comprising a microprocessor, memory, registers and analogue telephony circuitry, between the telephone network and the modem. This system then intercepts incoming call waiting signals, and communicates control signals between the network and the personal computer. In this way the system avoids disruption of the modem connection by the call waiting signal, and is able to offer the user choices as to how an incoming call is handled. However, since this solution relies upon the introduction of the second computing system at the customer premises, it is expensive and has not found commercial acceptance.

SUMMARY OF THE INVENTION

According to a first aspect of the present invention, there is provided a method of operating a telecommunications network comprising:

(a) establishing a dial-up connection via the telecommunications network between a user data terminal and a data services provider;

(b) transmitting a data channel over the dial-up connection; and (c) transmitting a call waiting signal on the data channel to the user when a call is made to the user by a third party.

The present invention provides a method of operating a telecommunications network which not only avoids the disruption of data connections associated with conventional call-waiting services, but also makes the call-waiting functionality available to users while their call to a data service provider is in progress. This is achieved by transmitting the call-waiting signal on the channel used for the data connection. The call-waiting signal is in this way integrated with the data connection, instead of disrupting it. Moreover, the signal is in a form which facilitates automatic handling of the response to the signal by programs running at the user data terminal and/or at the data services provider. Once the call-waiting signal has reached the user, then, as with the conventional call-waiting services, the user can choose to continue with the existing call, or may interrupt the calf to speak to the new caller. By contrast with prior art systems, the invention requires no additional hardware at the customer premises, nor does it require any modification to the modem.

Preferably, step (c) includes:
(i) diverting to the data services provider calls which are intended for the user; and
(ii) generating at the data services provider, in response to the receipt of an incoming third party call, the call waiting signal for transmission to the user.

It is found that a particularly effective approach to implementing the invention takes advantage of the existing call diversion functionality available on most exchanges. Once the user has established the dial-up connection with the data services provider. other calls for the user are diverted to the data services provider which can then generate an appropriate call waiting alert for transmission over the data channel to the user.

The method may optionally include a step, subsequent to the transmission of the call-waiting signal, of interrupting the connection with the data services provider and establishing an in-band connection between the user and the third party. In this case preferably the data services provider :s arranged to suspend any on-going data transaction with the user data terminal, and to resume the data transaction when the connection with the data services provider is re-established after the completion of the call from the third party.

Alternatively or in addition, the method may include establishing a voice connection between the third party and the user data terminal over the data channel.

Preferably the method includes generating at the data terminal, in response to receipt of the call waiting signal, a message alerting the user to the third party call. Advantageously, the handling at the data terminal of the call waiting signal uses the user interface of the data terminal both to display an "alert" message, which may include the calling line identity (CLI), and also to offer the user options for how the call is to be handled. The data terminal may then generate and return via the data channel to the data services provider a signal identifying the selected option.

According to a second aspect of the present invention, there is provided a telecommunications network arranged to provide a dial-up connection between a user data terminal and a data services provider, in use a data channel being transmitted over the dial-up connection, characterised by means for transmitting a call-waiting signal on the data channel to the data terminal in response to a call from a third party.

According to a further aspect of the present invention, there is provided a method of operating a call waiting system comprising:

(a) receiving from a telecommunications network a signal indicating a call has been made by a third party to a user, the said user having a current dial-up connection between a user data terminal and a data services provider; and (b) in response to the said signal generating a call waiting signal and transmitting the said call waiting signal on the data channel to the user.

The call waiting system may form part of a data server at the data services provider. Alternatively it may comprise a computer dedicated to this task, and may be located remotely from the data services provider. In this case it may output the call waiting signal, e.g. onto the internet, addressed to the user, for transmission via the data services provider.

The invention also encompasses data terminals and data servers configured for use with the network of the second aspect.

BRIEF DESCRIPTION OF THE DRAWINGS

Systems embodying the present invention will now be described in further detail, by way of example only, with reference to the accompanying drawings in which:

FIGS. 5 to 13 are message sequence diagrams showing message flows in the operation of the system of FIG. 1; and FIG. 14 illustrates a display on the user data terminal of FIG. 1.

DETAILED DESCRIPTION OF EXEMPLARY EMBODIMENTS

Figure 1:
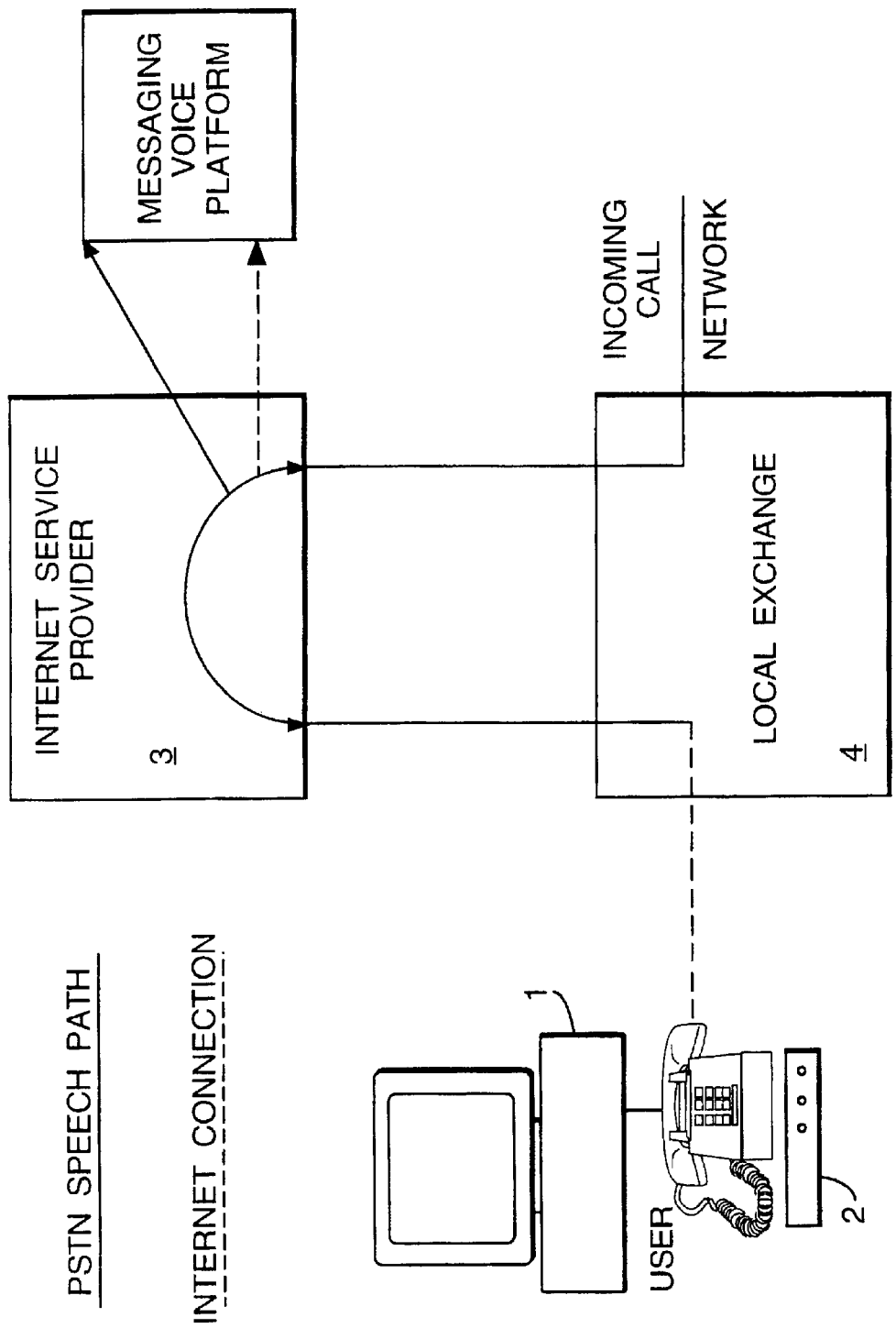
FIG. 1 is a schematic of a first system.

As shown in FIG. 1, a data terminal 1, which in this example is a personal computer 1 and modem 2, is connected to the server 3 of an internet services provider (ISP). The connection is made over the local exchange 4 of the public switched telephone network (PSTN). A data channel between the ISP and the data terminal 1 is carried on the PSTN lines by modulated FSK (Frequency-Shift-Keyed) tones. These FSK tones are generated and de-modulated by the modem 2 in a conventional manner. In this example, the data channel between the data terminal 1 and the server 3 is an internet connection using TCP/IP protocols.

Conventionally, if a call is made to the user of the data terminal while the terminal is connected to the ISP, then the caller will hear an engaged tone, or may be diverted to a messaging service such as BT's CallMinder. In either case, the user is unable to receive the call while connected to the ISP. As discussed in the introduction above, a conventional PSTN call waiting service cannot be used, since the transmission of an alert tone from the network to the user would disrupt the data channel. Systems embodying the present invention overcome these limitations by using the data channel between the ISP and the user to transmit a call waiting signal.

In the example of FIG. 1, the call waiting function is controlled by the ISP. When the user first establishes the dial up connection with the ISP, the ISP requests from the local exchange a "divert on busy/divert all" service. This request may be communicated using BT NUP signalling. In response to this request, the local exchange diverts all incoming calls for the user to the ISP. The calling line identity (CLI) is passed with any incoming call. On receiving a call, the ISP sends a call waiting alert and the CLI to the user via the data connection between the server and the user's data terminal. In this example, as further described below, the call waiting alert takes the form of data conforming to the user datagram protocol (UDP). This is interpreted by client software running on the personal computer and may, for example, trigger a pop-up window to appear on the PC screen. In the example illustrated in FIG. 14, a dialogue box 141 is superimposed on the window for the current program, a web browser. This dialogue box alerts the user to the presence of an incoming call and displays the CLI, and also provides options for handling the call. The options are selected using buttons 142,143,144. The client software running on the PC transmits back to the ISP a message indicating the user's selected option. In the present example, three options are provided:

1. Ignore the request ("REJECT"). In this case the ISP rejects the call or terminates the call on behalf of the user. The ISP optionally may terminate the call on a voice message platform or intelligent peripheral (IP). The connection to the voice message platform or IP may use for example, using PSTN speech paths. Alternatively, the connection to the voice message platform may be an internet connection using packetised speech. When the call waiting service is first established the default behaviour is agreed between the user and the ISP.

2. Accept call via ISP ("OK-IPHONE"). In this instance the call is routed via the ISP without the user having to drop the internet connection. The PSTN call is terminated at the ISP and the remaining leg of the call (ISP to user) is done over the TCP/IP data connection. The ISP converts the PSTN speech into packetised speech for transmission over the data connection. Bandwidth for speech on the data connection is provided by limiting the amount of non-speech data which is transmitted or received.

3. Accept the call/drop the modem carrier ("OK-SUSPEND"). In this instance, the connection to the ISP is still maintained but the data/internet session is suspended. The session context is maintained. The PSTN call is then routed through the ISP go the user as a normal speech call. Once the incoming call has finished, the user signals to the ISP that the internet connection is to be re-established. This may he done, for example, using in-band tones.

Figure 4:
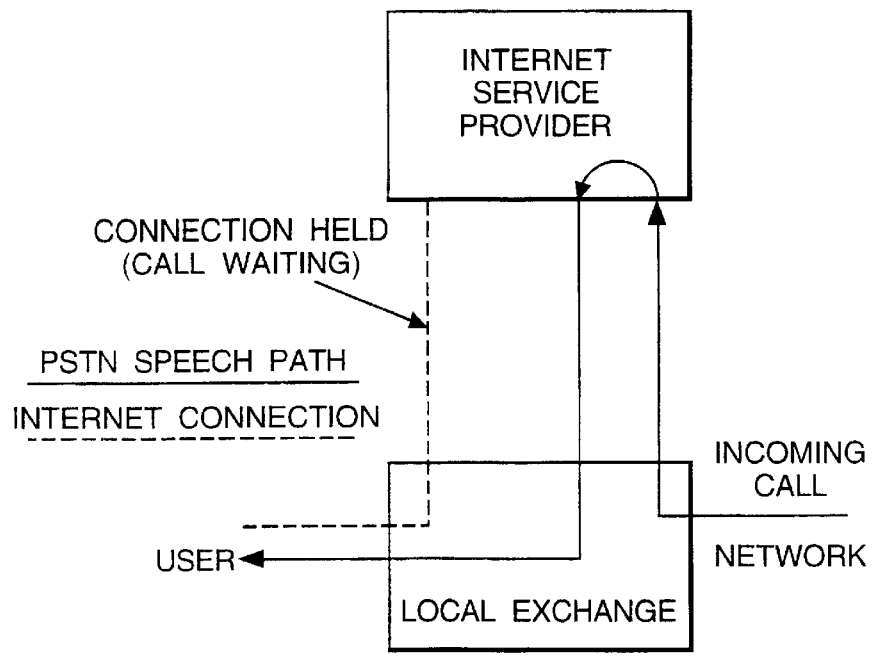
FIG. 4 Is a schematic of a second system embodying the present invention.

In this first example, call termination or forwarding is carried out entirely by ISP. The connection between the user and the ISP is maintained at all times. FIG. 4 illustrates an alternative approach, in which incoming calls may be dropped back to the exchange. Although, as in the first example, calls are initially diverted to the ISP, if, following the transmission of a call waiting alert from the ISP to the user, the user elects to drop the modem carrier and receive the call as a normal speech call, then the call is dropped back to the exchange for routing to the user. This may be implemented using a diversion override procedure of the type commonly found, for example, on PBX's. In other respects, the functioning of the call waiting procedure is as in the first example.

Figure 2:
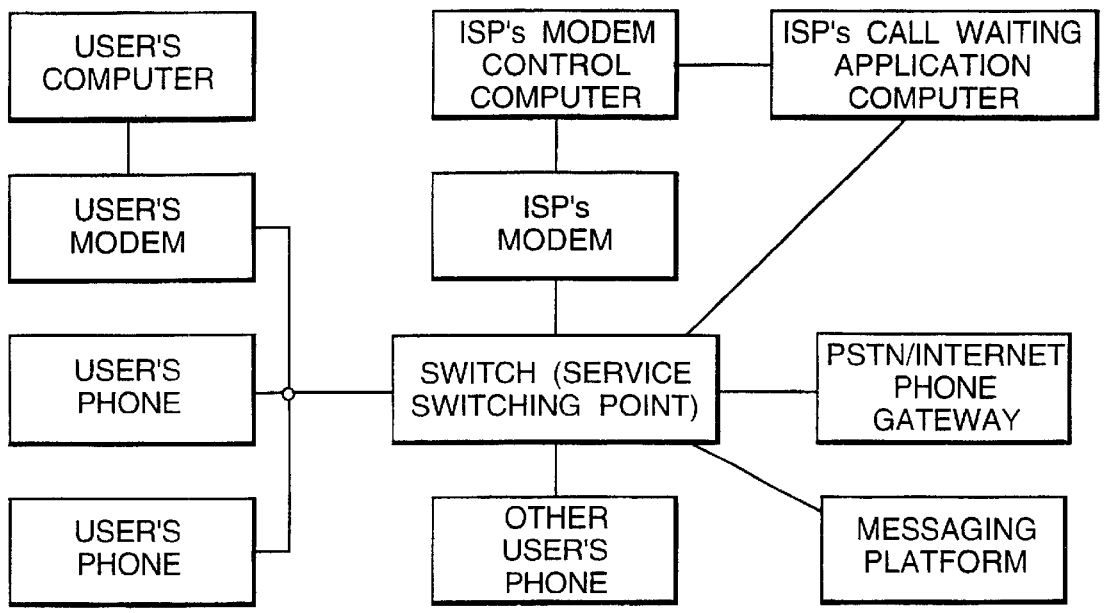
FIG. 2 is a diagram showing in further detail the hardware architecture of the system of FIG. 1.

An implementation of the system outlined above will now be described in further detail. FIG. 2 is a schematic showing the physical architecture of the system. At the user's side, in addition to the modem connected to the user's computer, one or more conventional analogue telephones are connected to the PSTN line. The PSTN line is connected to a local exchange which, in this example, is a service switching point (SSP) in a network employing an IN architecture.

On the ISP side, a modem interfaces the ISP server to a PSTN line connecting the server to a local exchange. There is also on the ISP side a computer running the call waiting application. This may be the same computer as the internet server, or may be a dedicated machine connected to the server via a local area network.

In addition to the user and the ISP, a messaging platform, a gateway to other networks (e.g. an internet phone service), and another user are shown in the Figure.

Figure 3:
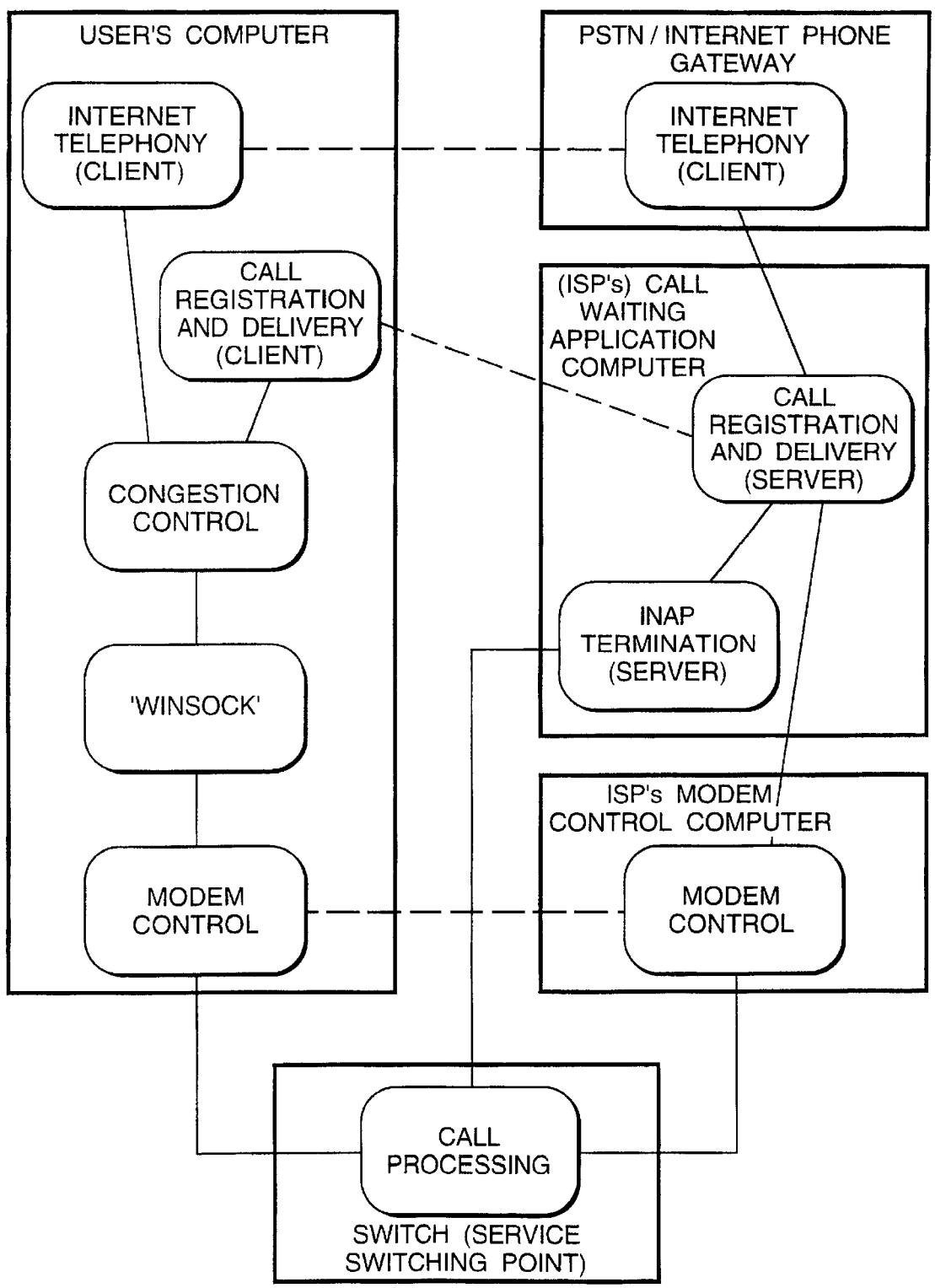
FIG. 3 is a diagram showing a software architecture for the system of FIG. 1.

FIG. 3 shows an example of a software architecture suitable for supporting the signalling flows and modem operations required to implement the invention. In defining the software components, the term client is used to denote the user's terminal or personal computer, and the term server is used to denote the computer system providing the call delivery service. This server may in some instances be separate from the ISP.

The software at the user's computer comprises an internet telephony client 31 and a call registration and delivery client 32. These are both interfaced to a congestion control module 33. These higher level services are supported by a winsock stack 34 and modem control software 35.

The software on the ISP side includes a call registration and delivery server module 36 and an INAP termination server module 37. These are both associated with the call waiting application computer. A modem control module 38 is located in the computer which is connected to the ISP's modem. An internet telephony server 39 is located at a PSTN/Internet phone gateway.

Describing these components in further detail, the call registration and delivery client 32 is the component on the client which communicates with the server for registration of the call waiting application. The communication mechanism is provided by user datagram protocol (UDP) signals passing between the client and the server. The identification of ports may be pre-defined, or can be assigned on a negotiation basis between the client and the server. The interface to the UDP protocol on the client side is achieved, in a Microsoft Windows (registered trade mark) environment using a standard Windows socket (winsock) stack. This software component interacts with the modem on the client. Typically the client modem is mapped onto serial I/O ports, and so commands can be sent to the modem via this mechanism using standard operating system interfaces.

The call registration and delivery software on the server side is responsible for signalling to the user on receipt of an incoming call via the INAP termination. After signalling that the call has been received, a module either terminates the call via the data connection, sending a confirmation back via the INAP interface that the call should be routed to the user via the PSTN, or that the call should be rejected or diverted. Which of these options is implemented depends on the response from the user or on defined default behaviour. If the call is to be terminated to the user via the PSTN, then this module is responsible for informing the ISP when the modem connection is to be suspended and when the modem connection is to be resumed. This software component also communicates with the client side call software and this is achieved using a standard winsock implementation. Communication between the INAP termination and this module can be achieved using any suitable mechanism as it is internal to the server. This module also issues commands to the ISP modem and this may use any communication mechanism (e.g. UDP) agreed between the server and the ISP software.

The internet telephony modules on the client and on the server make it possible to receive calls via the ISP using packetised speech over the data TCP/IP connection. The internet telephony modules both encode and decode between speech and IP packets, and provide signalling for flow control. Suitable software for the internet telephony client and server modules is available commercially as WebTalk from Quaterdeck Corp., of Marina del Rey, Calif., USA.

If calls are to be received over the data connection, then additional traffic over this connection needs to be minimised. This will then maximise the bandwidth and quality of the speech over the connection. To facilitate this, congestion control software may sit between the applications and the connection, i.e. within or above the winsock stack, to limit the bandwidth used by other data sources. For example, if 70% of the bandwidth of the connection is required for telephony, then this module limits the data transmitted from all other applications to at most 30% of the bandwidth. In the present example this function is implemented as a layer above the winsock stack. This then ensures that all applications use this interface. The congestion control software, on request from an application, limits bandwidth use based on packet destination and/or socket/port number. While the use of the congestion control module is not essential, its presence makes it possible for other applications to continue using the data connection concurrently with internet telephony over the connection.

The INAP termination module 37 in the server terminates INAP messages from the PSTN. It translates these into messages which can be interpreted by the server's call registration and delivery software. The INAP interface is defined to match the INAP protocol implemented in the PSTN components and in compliance with the standard set out in ETSI Core INAP, ETS 300 374-1 1994.

The modem control software in the ISP is responsible for ensuring that the modem connected to the user does not hang up on loss of the carrier signal. It maintains the modem on-line (off-hook) whilst the data connection is in a "suspended" state. This function is required to prevent the PSTN terminating the call when, after a certain period, the terminating party (ISP) remains on-hook. The interface between the modem control software and the server call registration and delivery software is internal to the server and so only requires internal compatibility. The ISP may implement the modem control software either as a separate software component which then issues commands to the modem internally, or directly within embedded software on the modem. In either case, the interface between the ISP and the modem is achieved using standard modem commands, for example the Hayes AT command set. On receipt of a "resumed" message the modem will return to data mode and attempt to synchronise with the client modem. The modem control software is arranged so that if loss of carrier is detected other than in the suspended state, the modem will react to this in a conventional manner by trying to re-establish the connection and/or hanging up.

Table 1 details the signalling between the eight distinct processes identified above. These protocols and signalling systems identified by way of example only, and as will be apparent many alternative implementations are possible.

The following section describes with reference to the message sequence diagrams of FIGS. 5 to 13 an example of the message flows and behaviours in an implementation of the invention. Each subsection represents a particular state (phase) of the system and event occuring while in that state.

The signalling used in implementing the invention uses three main timers (T1, T2, T3) and a retry counter (C1). Their use is described below:

Timer T1: 'keep alive' timer. Used to cause registration messages to be sent continually to the remote end so that link failure can be detected. Recommended value is 2 minutes. Expiry of this timer is only acted upon in the Active phase, and is ignored during other phases.

Timer T2: 'link failure' timer. Used to determine that a period has passed with no registration, and therefore assumes that the link has failed. Recommended value is 7 minutes. Expiry of this timer is only acted upon in the Active phase, and is ignored during other phases.

Timer T3: 'alerting' timer. Used to limit the amount of time a user has to respond to an incoming call indication from the ISP (in case the link has failed). Recommended value is 5 seconds. Expiry of this timer is only acted upon in the Awaiting Directions phase, and is ignored during other phases.

Counter C1: 'retry counter'. Used to count the number of times that a REGISTER message has been sent without a REGISTER COMPLETE message being received. The counter is tested and incremented on expiry of Timer T1, and is set to zero when a REGISTER COMPLETE message is received. The recommended limit for the counter is 3.

Phase 1—Initialisation (FIG. 5). This phase initialises the system. It begins with a modem connection being set-up between the user and ISP to allow packet data to be sent between the two. Once the data connection is established, the call waiting application on the user's terminal (denoted as 'user appl.') is started. This sends a REGISTER message to the ISP, which is routed (by way of a routing process not shown) to the call waiting application running on the ISP's equipment (denoted as 'ISP appl.').

On receipt of the REGISTER message, the ISP application records the registration for that user, and responds with) a REGISTER COMPLETE indication including the address of the ISP application to assist the routing of future messages. The ISP application then starts a 'link failure' timer, Timer T2.

On receipt of the REGISTER COMPLETE indication, the user's application starts the 'keep alive' timer, Timer T1, sets the retry counter C1 to zero, and indicates to the user that the registration has been successful. The system then moves to the ACTIVE phase.

If the REGISTER COMPLETE message is not received within a predetermined time period, the user's application will inform the user of unsuccessful registration. Further attempts to register will depend on the user's requirements.

Phase 2—Active (Timer T1 Expires)

(FIG. 6). When Timer T1 expires, the retry counter C1 is tested against its limit value. If it is below the limit value, then the retry counter C1 is incremented and the registration procedure is repeated. As the user's application is already registered, no registration action is taken by the ISP application. Also, Timer T1 is started before the receipt of the REGISTER COMPLETE message. On receipt of a REGISTER COMPLETE message, the retry counter C1 is reset to zero. The system stays in the ACTIVE phase.

If the retry counter C1 has reached the limit, then it is assumed that the link has failed, and the user is informed. Initialisation of the system will take place if required by the user.

Phase 2—Active (Timer T2 Expires)

Figure 7:
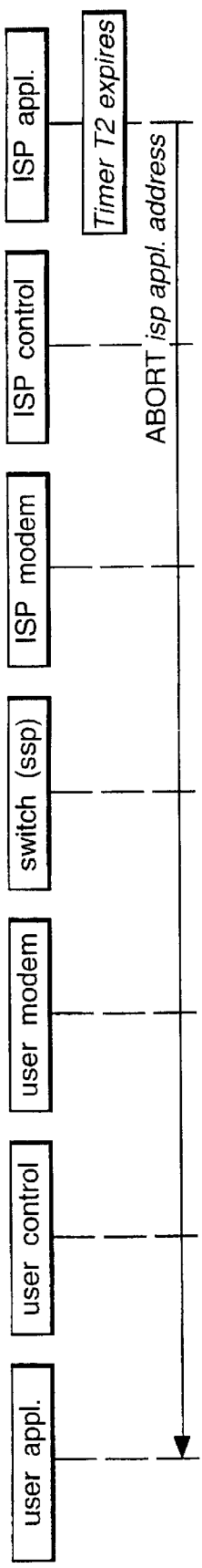

(FIG. 7). Expiry of Timer T2 indicates that the link has failed. The ISP application removes the registration of that user and moves to an idle state ready for initialisation.

To ensure that the user is aware of this (if possible), an ABORT message is sent to the user's application, which can be acted upon appropriately by the user's application.

Phase 2—Active (Incoming Call)

Figure 8:
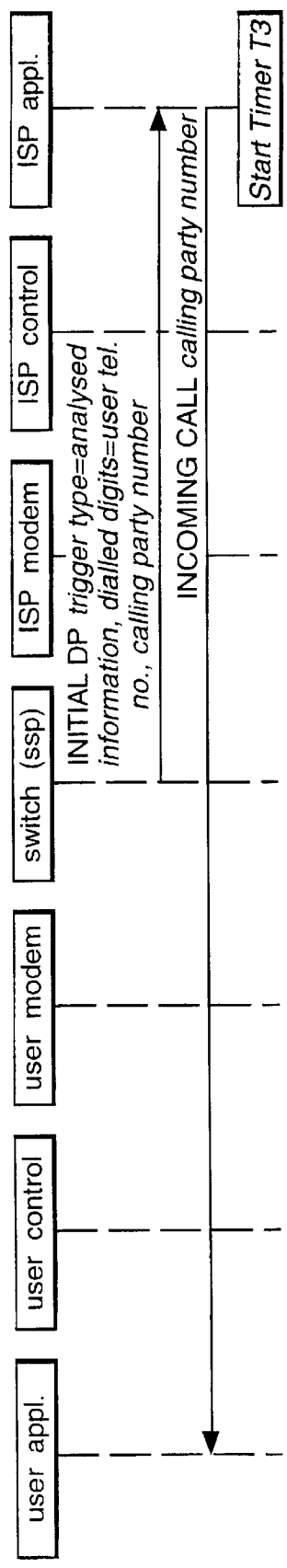

(FIG. 8). When an incoming PSTN call from a third party to the user is presented to the switch, an indication is sent to the ISP's application. (This assumes that the trigger for this and routing to the ISP's application has been previously set-up using the appropriate procedures). This results in an INCOMING CALL message being sent to the user's application, indicating the the number of the third party, and Timer T3 being started. The system then moves to the AWAITING DIRECTIONS phase.

Phase 3—Awaiting Directions (Timer T3 Expires)

Figure 9:
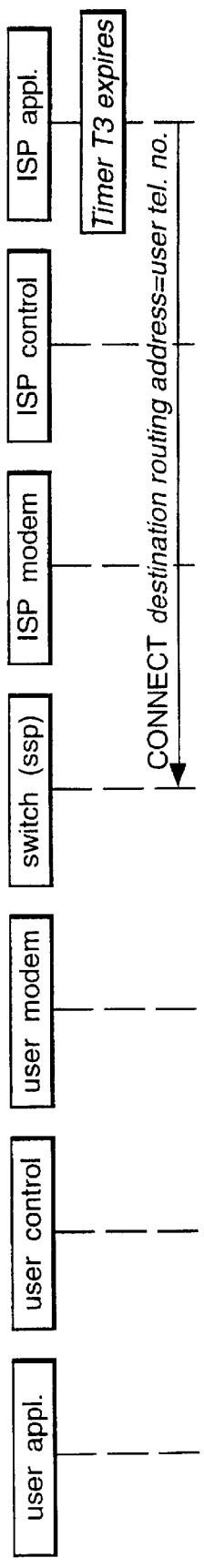

(FIG. 9). If Timer T3 expires, it is assumed that a failure has occured in the system. As a result, the switch is informed to continue the default processing of the call. The system will then return to the Active phase, using timer T2 expiry to force the service to abort if necessary.

Phase 3—Awaiting Directions (Timer T3 Expires)

Figure 10:
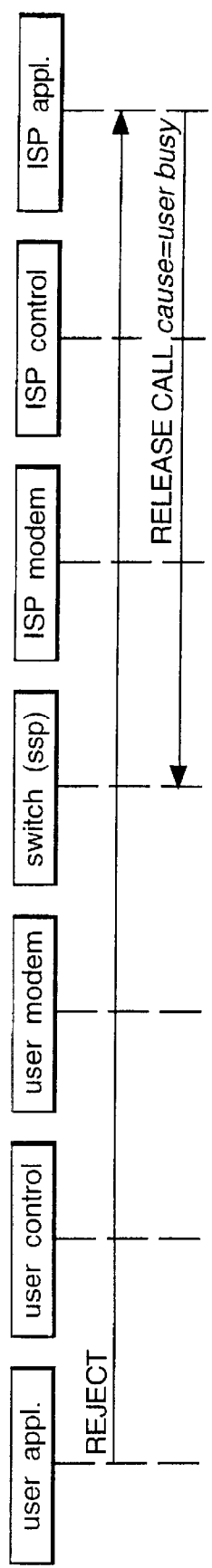

(FIG. 10). It the user wishes to reject the incoming call, a REJECT message is sent from the user's application to the ISP's application. The ISP's application will then tell the switch to deal with the incoming call appropriately. This could be by connecting the call to an internal resource to play an announcement, or by releasing the incoming call as 'busy' using the RELEASE CALL message (as shown in the figure). The system will then return to the Active phase.

Phase 3—Awaiting Directions (Reject Incoming Call)

Figure 11:
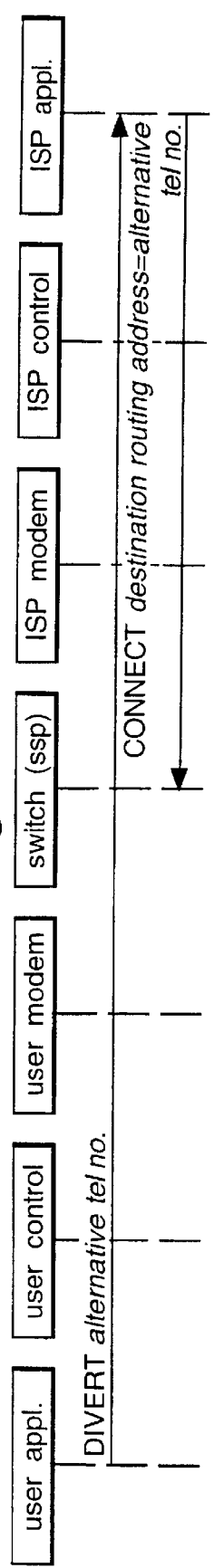

(FIG. 11). Rather than rejecting the incoming call, the user may decide to divert it. The call may be diverted to another user, a messaging system, or to a PSTN/Internet Phone Service gateway (which will allow the user to answer the incoming call via the Internet as packetized speech). In all of these cases, the call will be diverted by the user's application sending a DIVERT message to the ISP's application, indicating the telephone number to which the call should be diverted (ie. the number of the alternative user, messaging platform, or PSTN/Internet gateway).

On receipt of the DIVERT message, the ISP's application will instruct the switch to connect the call to the alternative number, using a CONNECT message. The system will then return to the Active phase.

Phase 3—Awaiting Direction (Accept Incoming Call)

Figure 12:
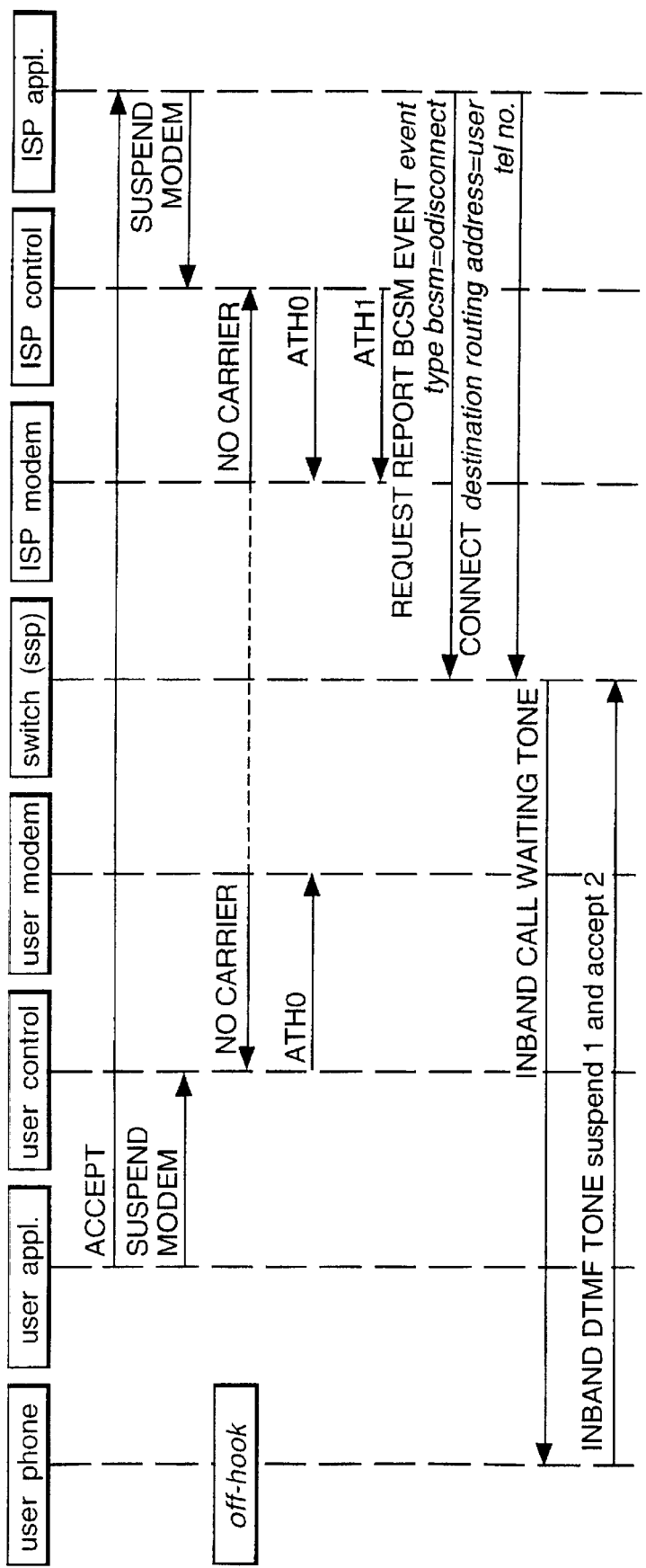

(FIG. 12). It the user decides to accept the incoming call, an ACCEPT message is sent to the ISP's application, and both the user's and ISP's modem controllers are informed of this by way of a SUSPEND MODEM message. At the same time, the user is told to pick up the handset of the phone, taking the phone to an off-hook state (note that the user's phone line is already off-hook due to the modem). Once the phone is off-hook, the carrier can be lost. When no carrier is present, the user's modem is placed on-hook (ATH0), although the user's line remains off-hook since the phone is off-hook. The ISP's modem is placed on-hook, then immediately taken off-hook (ATH1). This prevents the modem from going on-hook automatically, and makes it ready to re-instate the carrier later on. This procedure may need to be repeated at the ISP's end to prevent the modem from going on-hook automatically (note, as the ISP received the call from the user, going on-hook for a few seconds will not clear the call).

The ISP's application then sets a request trigger on the switch so that it is informed when the incoming call is disconnected (using the REQUEST REPORT BCSM EVENT message), and then asks the switch to connect the incoming call to the user, using the CONNECT message. The CONNECT will initiate the PSTN switch-based call waiting service, which will cause the call waiting tone to be played to the user (via the user's phone). Using the necessary tones and line breaks (recall), the users can then suspend the call to the ISP and accept the incoming call. This takes the system to the In Call phase.

Phase 4—In Call (Resume Suspended Call)

Figure 13:
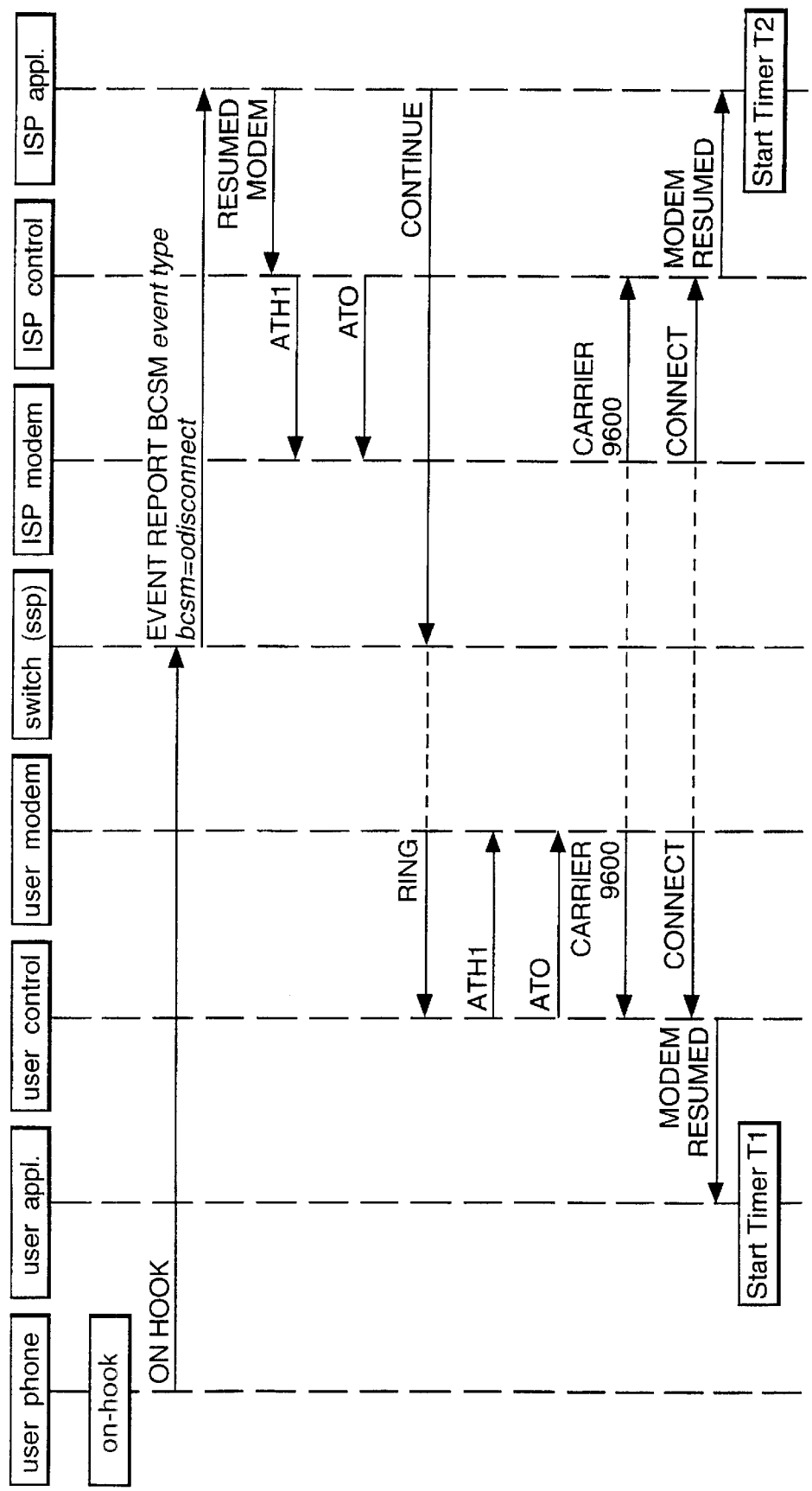

(FIG. 13). Once the incoming call has been answered, conversation can take place. At the end of this call, the call is cleared, and the call to the ISP is resumed. This sequence is initiated by the user (and calling party) placing the phone handset on-hook, which causes the users line to go into an on-hook state, and causing an EVENT REPORT BCSM message to be sent to the ISP's application, indicating that the call has been disconnected.

The ISP's application will than tell the ISP's modem controller to resume, which then ensures that the modem is off-hook (ATH1) and on-line (ATO). At the same time, the switch is told to continue processing, via a CONTINUE message. This causes the user's line to ring, indicating the presence of the suspended call. The user's modem controller then take the user's modem off-hook (ATH1) and puts it on-line (ATO). The modems will then re-train, and will inform the modem controllers when a data connection is established. This event is indicated to the user's and ISP's applications by a MODEM RESUMED message.

Once the modems have resumed service, the 'keep alive' timers are started, and the system returns to the Active phase.

The suspend-resume protocols outlined above may also be used to allow suspension of a data session to be initiated by the user of the data terminal in order to make an outgoing call. A button for selecting this option may be displayed in a dialogue box or the terminal screen. When this option is selected, a signal to this effect is transmitted to the ISP. The three-way calling functionality of the telephony network is then used. The user transmits a "recall" signal, and then dials the destination number of the outgoing call. When that call is completed, the modems at the terminal and at the data services provider resynchronise and the suspended data session is resumed.

(a) establishing a dial-up connection via the telecommunications network between a user data terminal and a data services provider;

(b) establishing a data channel with said data services provider over the dial-up connection;

(c) transmitting a call waiting signal on the data channel to the user when a call is made to the user by a third party;

(d) establishing a voice connection between the third party and the user data terminal over the data channel whereby said data channel carries both data representing said voice connection and other data; and (e) limiting the amount of said other data allowed to be transmitted over said data channel to a predetermined amount.

2. A method according to claim 1, in which step (c) includes:

(i) diverting to a call waiting system calls which are intended for the user; and (ii) generating at the call waiting system, in response to the receipt of an incoming third party call, the call waiting signal for transmission to the user.

3. A method according to claim 2, in which said call waiting system is located at the data services provider.

4. A method according to claim 1, further comprising:
generating at the data terminal, in response to receipt of the call waiting signal, a message alerting the user to the third party call.

5. A method according to claim 4, wherein generating the message includes indicating a plurality of options for handling the third party call, registering via a user interface of the data terminal a selection made by the user from the plurality of options, and generating and returning via the data channel to the data services provider a signal identifying the selection option.

6. A method according to claim 4, wherein the message alerting the user includes the calling line identity (CLI) of the third party.

TABLE 1

| | | Signalling to process | | | | | | |
|---|---|---|---|---|---|---|---|---|
| | | user's phone | user's appl. | user's control | user's modem | switch (SSP) | ISP's modem | ISP's control | ISP's appl. |
| Signalling from process | user's phone | | | | | BT PSTN | | | |
| | user's appl. | | | * | | | | | * |
| | user's control | | * | | Hayes 'AT' | | | | |
| | user's modem | | | Hayes 'AT' | | BT PSTN | | | |
| | switch (SSP) | BT PSTN | | | BT PSTN | | BT PSTN | | INAP |
| | ISP's modem | | | | | BT PSTN | | Hayes 'AT' | |
| | ISP'S control | | | | | | Hayes 'AT' | | * |
| | ISP's appl. | | * | | | INAP | | * | |

Key
Signalling System   Description
*                   new signalling relating to the invention
BT PSTN             BT PSTN analogue signalling and Network Services
Hayes 'AT'          Hayes 'AT' command set
INAP                ETSI Core INAP

What is claimed is:

1. A method of operating a telecommunications network comprising:

7. A method according to claim 1, further comprising:
initiating from the user data terminal suspension of a data session on the data channel, making an outgoing call from the user to another party, and on termination of the outgoing call, automatically resuming the suspended data session.

8. A method as in claim 1, wherein limiting the amount of said other data comprises limiting the bandwidth used by said other data based on packet destination and/or port number.

9. A data terminal comprising:

a) a data interface which in use establishes a data channel with a data services provider via a dial-up connection;

b) a display device;

c) module for digital telephony; and d) a call waiting signal handler connected to the data interface and arranged to (i) process an incoming call waiting signal received on the data channel and to generate and display on the display device a call waiting alert for the user and (ii) upon receipt of a signal from the user to accept a waiting call, to enable said module for digital telephony whereby said data channel carries data for digital telephony and other data; and e) a controller arranged to limit the amount of said other data allowed to be transmitted over said data channel to a predetermined amount.

10. A terminal as in claim 9, wherein the controller limits the amount of said other data by limiting bandwidth used by said other data based on packet destination and/or port number.

* * * * *